US007236883B2

(12) United States Patent
Garin et al.

(10) Patent No.: US 7,236,883 B2
(45) Date of Patent: Jun. 26, 2007

(54) AIDING IN A SATELLITE POSITIONING SYSTEM

(75) Inventors: Lionel Jacques Garin, Palo Alto, CA (US); Leon Kuo-Liang Peng, Mountain View, CA (US); Gengsheng Zhang, Cupertino, CA (US); Nicolas Patrick Vantalon, Nice (FR)

(73) Assignee: Sirf Technology, Inc., San Jose, CA (US)

( * ) Notice: Subject to any disclaimer, the term of this patent is extended or adjusted under 35 U.S.C. 154(b) by 0 days.

(21) Appl. No.: 10/515,808

(22) PCT Filed: Dec. 4, 2003

(86) PCT No.: PCT/US03/16308

§ 371 (c)(1),
(2), (4) Date: Oct. 3, 2005

(87) PCT Pub. No.: WO03/100454

PCT Pub. Date: May 22, 2003

(65) Prior Publication Data

US 2006/0095206 A1    May 4, 2006

Related U.S. Application Data

(63) Continuation of application No. 10/155,614, filed on May 22, 2002, now Pat. No. 6,684,158, which is a continuation-in-part of application No. 09/795,871, filed on Feb. 28, 2001, now Pat. No. 6,427,120.

(60) Provisional application No. 60/225,076, filed on Aug. 14, 2000.

(51) Int. Cl.
*G01C 21/00* (2006.01)

(52) U.S. Cl. ............... 701/213; 701/215; 342/357.05; 342/357.06; 342/357.1; 342/357.12; 455/3.01

(58) Field of Classification Search ........ 701/207–215; 342/357.01, 357.05, 357.06, 357.1, 357.12; 455/456.1, 456.6, 3.01
See application file for complete search history.

(56) References Cited

U.S. PATENT DOCUMENTS 4,426,712 A    1/1984    Gorski-Popiel (Continued)

FOREIGN PATENT DOCUMENTS

EP    0511741    11/1992

(Continued)

OTHER PUBLICATIONS

Soliman et al., gps One: A hybrid position location system, 2000 IEEE, pp. 334-335.

(Continued)

*Primary Examiner*—Gertrude A. Jeanglaude
(74) *Attorney, Agent, or Firm*—The Eclipse Group LLP

(57) ABSTRACT

The invention relates to an aided Global Positioning System (GPS) subsystem within a wireless device. The wireless device includes a wireless processing section capable of receiving signals from a wireless network and a GPS subsystem having a radio frequency (RF) front-end capable of receiving a GPS satellite signal. The wireless processing section of the wireless device receives an external clock and determines the offset between the clock in the wireless processing section and that of the external clock. The GPS subsystem then receives the offset information from the wireless processing section, information related to the nominal frequency of the wireless processing section clock and the wireless processing section clock. Using this information and the GPS clock in the GPS subsystem, the GPS subsystem determines an acquiring signal, which is related to a frequency offset between the GPS clock and the network clock. The GPS subsystem then acquires GPS satellite signals in an acquiring unit though the use of the acquiring signal.

30 Claims, 13 Drawing Sheets

U.S. PATENT DOCUMENTS

| | | |
|---|---|---|
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,177,490 A | 1/1993 | Ando et al. |
| 5,202,829 A | 4/1993 | Geier |
| 5,223,844 A | 6/1993 | Mansell et al. |
| 5,225,842 A | 7/1993 | Brown et al. |
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,365,450 A | 11/1994 | Schuchmman et al. |
| 5,379,224 A | 1/1995 | Brown et al. |
| 5,402,347 A | 3/1995 | McBurney et al. |
| 5,402,441 A | 3/1995 | Washizu et al. |
| 5,416,712 A | 5/1995 | Geier et al. |
| 5,420,593 A | 5/1995 | Niles |
| 5,422,813 A | 6/1995 | Schuchman et al. |
| 5,440,313 A | 8/1995 | Osterdock et al. |
| 5,450,344 A | 9/1995 | Woo et al. |
| 5,504,684 A | 4/1996 | Lau et al. |
| 5,506,587 A | 4/1996 | Lans |
| 5,535,278 A | 7/1996 | Cahn et al. |
| 5,587,715 A | 12/1996 | Lewis |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,666,330 A | 9/1997 | Zampetti |
| 5,701,328 A | 12/1997 | Schuchman et al. |
| 5,726,893 A | 3/1998 | Schuchman et al. |
| 5,739,786 A | 4/1998 | Greenspan et al. |
| 5,757,786 A | 5/1998 | Joo |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,578 A | 5/1999 | Pon et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,940,027 A | 8/1999 | Forseth et al. |
| 5,943,363 A | 8/1999 | Hanson et al. |
| 5,945,944 A * | 8/1999 | Krasner .................. 342/357.06 |
| 5,963,582 A | 10/1999 | Stansell, Jr. |
| 5,966,403 A | 10/1999 | Pon |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A * | 5/2000 | Krasner .................. 342/357.05 |
| 6,081,229 A | 6/2000 | Soliman et al. |
| 6,085,090 A | 7/2000 | Yee et al. |
| 6,097,974 A | 8/2000 | Camp, Jr. et al. |
| 6,104,338 A | 8/2000 | Krasner |
| 6,104,340 A | 8/2000 | Krasner |
| 6,104,712 A | 8/2000 | Robert et al. |
| 6,107,960 A | 8/2000 | Krasner |
| 6,111,540 A * | 8/2000 | Krasner .................. 342/357.1 |
| 6,111,541 A | 8/2000 | Karmel |
| 6,122,506 A * | 9/2000 | Lau et al. .................. 455/427 |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,172,640 B1 | 1/2001 | Durst et al. |
| 6,178,195 B1 | 1/2001 | Durboraw, III et al. |
| 6,185,427 B1 | 2/2001 | Krasner et al. |
| 6,188,351 B1 | 2/2001 | Bloebaum |
| 6,211,819 B1 | 4/2001 | King et al. |
| 6,222,484 B1 | 4/2001 | Seiple et al. |
| 6,225,944 B1 | 5/2001 | Hayes |
| 6,236,354 B1 | 5/2001 | Krasner |
| 6,236,365 B1 | 5/2001 | LeBlanc et al. |
| 6,249,245 B1 | 6/2001 | Watters et al. |
| 6,252,543 B1 * | 6/2001 | Camp .................. 342/357.06 |
| 6,263,280 B1 | 7/2001 | Stingone, Jr. |
| 6,313,786 B1 | 11/2001 | Sheynblat et al. |
| 6,327,473 B1 | 12/2001 | Soliman et al. |
| 6,347,228 B1 | 2/2002 | Ludden et al. |
| 6,353,412 B1 | 3/2002 | Soliman |
| 6,389,291 B1 | 5/2002 | Pande et al. |
| 6,400,314 B1 | 6/2002 | Krasner |
| 6,405,132 B1 | 6/2002 | Breed et al. |
| 6,411,811 B2 | 6/2002 | Kingdon et al. |
| 6,414,987 B1 | 7/2002 | Pon |
| 6,427,120 B1 | 7/2002 | Garin et al. |
| 6,429,815 B1 | 8/2002 | Soliman |
| 6,433,739 B1 | 8/2002 | Soliman |
| 6,456,234 B1 | 9/2002 | Johnson |
| 6,462,708 B1 | 10/2002 | Tsujimoto et al. |
| 6,466,612 B2 | 10/2002 | Kohli et al. |
| 6,473,030 B1 | 10/2002 | McBurney et al. |
| 6,480,145 B1 | 11/2002 | Hasegawa |
| 6,505,161 B1 | 1/2003 | Brems |
| 6,519,466 B2 | 2/2003 | Pande et al. |
| 6,526,352 B1 | 2/2003 | Breed et al. |
| 6,529,829 B2 | 3/2003 | Turetzky et al. |
| 6,542,823 B2 | 4/2003 | Garin et al. |
| 6,583,734 B2 | 6/2003 | Bates et al. |
| 6,633,255 B2 | 10/2003 | Krasner |
| 6,650,694 B1 | 11/2003 | Brown et al. |

| | | | | | | |
|---|---|---|---|---|---|---|
| 6,677,894 B2 | 1/2004 | Sheynblat et al. | | GB | 2115195 | 9/1983 |
| 6,684,158 B1 | 1/2004 | Gariu et al. | | GB | 2 335 554 A | 9/1999 |
| 6,707,423 B2 | 3/2004 | Turetzky et al. | | JP | 58-105632 | 6/1983 |
| 6,720,920 B2 | 4/2004 | Breed et al. | | JP | 7-36035 | 5/1986 |
| 6,731,238 B2 | 5/2004 | Johnson | | JP | 4-326079 | 11/1992 |
| 6,738,630 B2 | 5/2004 | Ashmore | | JP | 2000-102058 | 4/2000 |
| 6,748,217 B1 | 6/2004 | Hunzinger et al. | | WO | WO 90/11652 | 10/1990 |
| 6,829,534 B2 | 12/2004 | Fuchs et al. | | WO | WO 99/47943 | 9/1999 |
| 6,873,288 B2 | 3/2005 | Heppe | | WO | WO 00/10031 | 2/2000 |
| 7,091,904 B2 | 8/2006 | Vantalon et al. | | WO | WO 00/45191 | 8/2000 |
| 2002/0064209 A1 | 5/2002 | Turetzky et al. | | WO | WO 01/62034 A | 8/2001 |
| 2002/0080063 A1 | 6/2002 | Bloebaum et al. | | WO | WO 02/04975 | 1/2002 |
| 2002/0142783 A1* | 10/2002 | Yoldi et al. ............... 455/456 | | WO | WO 03/098258 | 11/2003 |
| 2003/0104818 A1 | 6/2003 | Kotziu | | WO | WO06/014170 | 2/2006 |
| 2003/0125044 A1 | 7/2003 | Deloach et al. | | | | |
| 2003/0154025 A1* | 8/2003 | Fuchs et al. ............... 701/213 | | | | |
| 2003/0176204 A1 | 9/2003 | Abraham | | | | |
| 2004/0130484 A1 | 7/2004 | Krasner | | | | |
| 2004/0162084 A1 | 8/2004 | Wang | | | | |
| 2005/0038719 A1 | 2/2005 | Young et al. | | | | |
| 2006/0036365 A1* | 2/2006 | Chiayee et al. ............ 701/213 | | | | |

FOREIGN PATENT DOCUMENTS

| | | | |
|---|---|---|---|
| EP | 1 092 987 | 4/2001 | |
| EP | 1 427 236 A | 6/2004 | |
| EP | 1 452 886 A | 9/2004 | |

OTHER PUBLICATIONS

Van Nee et al., New Fast GPS Code-Acquisition Technique Using FFT, Electronic Letters, vol. 27, No. 2, pp. 158-160 (1991).

Coenen et al., Novel Fast GPS/Glonass Code Acquisition Techinque Using Low Update Rate FFT, Electronic Letters, vol. 28, No. 9, pp. 863-865 (1992).

* cited by examiner

AIDING IN A SATELLITE POSITIONING SYSTEM

CROSS REFERENCE TO RELATED APPLICATIONS

This application is a continuation of U.S. patent application Ser. No. 10/155,614, filed May 22, 2002, now U.S. Pat. No. 6,684,158 titled Search Domain Reducing Frequency Transfer in a Multi-mode Global Positioning System Used With Wireless Networks, which is a continuation-in-part of U.S. patent application Ser. No. 09/795,871, filed Feb. 28, 2001, titled Information Transfer in a Multi-mode Global Positioning System Used with Wireless Networks, now U.S. Pat. No. 6,427,120, which claims priority under Section 119(e) to U.S. Provisional Application Ser. No. 60/225,076, filed Aug. 14, 2000, all of which are incorporated into this application by reference.

BACKGROUND OF THE INVENTION

1. Field of Invention

The invention relates to Satellite Positioning System (SPS) receivers, and in particular to increasing the accuracy of SPS receivers by providing the receivers with information to correct for the frequency offset between the oscillators of the receivers and those of the satellites.

2. Related Art

Satellite Positioning System (SPS) receivers, such as Global Positioning System (GPS), also known as NAVSTAR, receivers, receive radio transmissions from satellite-based radio navigation systems and use those received transmissions to determine the location of the SPS receiver. The location of the SPS receiver may be determined by applying the well-known concept of intersection if the distances from the SPS receiver to three SPS satellites having known satellite locations.

Generally, each satellite in a satellite-based radio navigation system broadcasts a radio transmission, that contains its location information, and orbit information. More specifically, each of the orbiting satellites in the GPS system contains four highly accurate atomic clocks: two Cesium and two Rubidium. These clocks provide precision timing pulses used to generate two unique binary codes (also known as a pseudo random noise "PRN," or pseudo noise "PN" code) that are transmitted to earth. The PN codes identify the specific satellite in the constellation. The satellite also transmits a set of digitally coded ephemeris data that completely defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the exact position of the satellite above the earth at any given time.

Although atomic clocks are very precise with a stability of about 1 to 2 parts in $10^{13}$ over a period of one day, a slight error (generally known as clock drift) may occur in the clocks over time resulting in satellite clock errors of about 8.64 to 17.28 ns per day with corresponding range errors of 2.59 to 5.18 meters. In order to compensate for the error, the accuracy of the satellite atomic clocks are continuously monitored from ground stations in the GPS control system and any detected errors and drift in the clock of the satellites may be calculated and transmitted by the satellites as part of a navigation message in the form of three coefficients of a second-degree polynomial.

In the case of GPS, there is nominally a constellation of 24 operational satellites above the Earth. Each satellite has individual PN codes, a nearly circular orbit with an inclination of 55° to the equator with a height of 10,898 nautical miles (20,200 kilometers) above Earth and an orbital period of approximately 12 hours. Each GPS satellite transmits a microwave radio signal composed of two carrier frequencies modulated by two digital codes and a navigation messages. The two carrier frequencies are referred to as the "L1" and "L2" carriers and are transmitted at 1,572.42 megahertz (MHz) and 1,227.60 MHz, respectively. The two GPS codes are called the coarse acquisition (C/A-code) and precision (P-code). Each code consists of a stream of binary digits, zeros and ones, known as bits or "chips." Both the C/A-code and P-code are generally referred to as a PN code because they look like random noise-like signals. Presently, the C/A-code is modulated only on the L1 carrier while the P-code is modulated on both L1 and L2 carriers.

The C/A-code has a chipping rate of 1.023 MHz because it is a stream of 1,023 binary digits that repeats itself every millisecond. Each satellite is assigned a unique C/A-code, which enables a GPS receiver to identify which satellite is transmitting a particular code. The C/A-code range measurement is relatively less precise when compared to the P-code but it is also less complex and available to all users. The P-code is mostly limited in use to the United States government and military.

Each satellite also transmits a GPS navigation message that is a data stream added to both the L1 and L2 carriers as binary bi-phase modulation at 50 kilo-bits per second (kbps). The navigation message contains, along with other information, the coordinates of the GPS satellites as a function of time, the satellite health status, the satellite clock corrections, the satellite almanac, and atmospheric data. Each satellite transmits its own navigation message with information on the other satellites, such as the approximate location and health status.

By receiving these radio signals emitted from the satellites, a GPS receiver may calculate its distance from the satellite by determining how long it took the GPS receiver to receive the signal transmitted from the satellite. For example, a GPS receiver could calculate its two-dimensional position (longitude and latitude or X and Y) by determining its distance from three satellites. Similarly, the GPS receiver could calculate its three-dimensional position (longitude, latitude and altitude or X, Y and Z) by measuring its distance from four satellites.

Unfortunately, this approach assumes that the distances measured from the GPS receiver to the satellites are very accurate and there is no bias error. In practice, however, the distance measured between the GPS receiver and each satellite typically has a constant unknown bias, because the GPS receiver clock (GPS-CLK) is usually different from the GPS satellite clocks. In order to resolve this bias error one more satellite transmission is typically needed to calculate the location of the GPS receiver.

Generally, to receive the signals transmitted by the satellites, the GPS-CLK of the GPS receiver should be synchronized with that of the GPS satellites. Any errors in the synchronization between the clocks will cause inaccuracies the measurement of the location of the GPS receiver. Atomic clocks, like those found in the GPS satellites, are very expensive typically costing a few thousand dollars for a Rubidium clock and a few tens of thousands of dollars for a Cesium clock. They are therefore not practical for use in typical consumer GPS receivers. Inexpensive, less accurate clocks, such as crystal clocks, are generally utilized in GPS receivers as GPS-CLKs. However, unless the inaccuracy of the GPS-CLK is determined and corrected for, synchronization with that of the atomic clocks of the satellites will be partially off and the resulting distance measurement calculated by the GPS receiver will be partially inaccurate. Thus, the error of the GPS-CLK is yet another unknown variable that must be determined to accurately determine the location of the GPS receiver.

Besides accuracy, another problem associated with the error of the GPS-CLK relative to the GPS satellite clocks is the resulting acquisition time for the GPS receiver commonly known as the time to first fix (TTFF). For many applications, such as E911, a GPS receiver must be able to provide a position solution in a short period of time after the GPS receiver is powered on. Unfortunately, the GPS-CLK can have large frequency drift during the first couple minutes after being powered on. The large frequency drift can cause significant degradation on TTFF performance and may even result in lack of navigation fix in weak signal environments.

In addition to the frequency drift in the GPS-CLK, there are a number of other factors that can affect TTFF performance. Although there are a large number of GPS satellites positioned above the earth's atmosphere, it is not always possible for a GPS receiver to receive accurate transmissions from the required number of GPS satellites necessary to calculate the position of the GPS receiver. Any number of problems may prevent a GPS receiver from receiving the necessary number of signals, or from receiving accurate signals because of transmission or receiver errors. These problems can result in high TTFF times.

For example, a GPS receiver may not be able to receive the necessary number of GPS transmissions due to physical obstructions in the atmosphere or on the earth. Alternatively, even though a GPS receiver may be able to receive the necessary signals, the signal could be inaccurate due to any of the following: (i) error in the satellite clock; (ii) error in the receiver clock; (iii) error in computed satellite position; (iv) atmospheric errors caused by the ionosphere or the troposphere; (v) multipath errors caused by the receipt of reflective signals; (vi) receiver measuring errors and/or (vii) selective errors, or man made errors. These inaccuracies could lead to TTFF times that may be over thirty seconds because the GPS receiver needs to obtain the ephemeris data from the GPS system itself, and the GPS receiver typically needs a strong signal to acquire the ephemeris data reliably.

Since the inception of GPS, methods have been, and are still being, developed to reduce errors and to enhance the accuracy of the GPS systems. Further, many different methods are being implemented to provide alternative means for providing the GPS receiver with information concerning unknown variables or inaccuracies in the system such that it is not always required for the system to receive satellite transmission signals from all the satellites or to receive accurate transmission data.

One technique that has been introduced to assist with overcoming errors in the GPS system is differential GPS. With differential GPS, a receiver having a known location receives the GPS signals and calculates its position from the received signals. The calculated position is then compared to the actual known position of the receiver. The differential between the known position and the calculated position can then be used to calculate errors in the transmission signals. These errors can then be transmitted to receivers in unknown locations ("mobile receivers") and used by the mobile receivers to compute their own location with better accuracy.

Differential GPS is typically used to correct for errors other than receiver or multipath errors. However, in a similar manner as differential GPS, correction data may be sent to the GPS receiver to correct for receiver errors. For example, one method that has been used to correct for errors in the GPS-CLK has been to send a precision carrier frequency signal to the GPS receiver from a second source, such as a base station. In this application, the GPS receiver is designed to receive the precision carrier frequency signal and then calibrate and/or lock the GPS-CLK to that of the precision carrier frequency. This method, however, typically involves the use of additional complicated circuitry that first locks and/or calibrates the GPS-CLK to the precision carrier frequency and then maintains dynamic synchronization between the GPS-CLK and precision carrier frequency.

A need therefore exists for a method of compensating for errors created by the drift of the GPS-CLK to increase positional accuracy and improve TTFF in a dynamic manner without utilizing additional complex circuitry and without significantly modifying the existing hardware.

SUMMARY

The invention relates to aiding a Global Positioning System (GPS) subsystem within a wireless device. The wireless device includes a wireless processing section capable of receiving signals from a wireless network and a GPS subsystem having a radio frequency (RF) front-end capable of receiving a GPS satellite signal. The wireless processing section of the wireless device receives an external clock and determines the offset between the clock in the wireless processing section and that of the external clock. The GPS subsystem then receives the offset information from the wireless processing section, information related to the nominal frequency of the wireless processing section clock and the wireless processing section clock. Using this information and the GPS clock in the GPS subsystem, the GPS subsystem determines an acquiring signal, which is related to a frequency offset between the GPS clock and the network clock. The GPS subsystem then acquires GPS satellite signals in an acquiring unit though the use of the acquiring signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
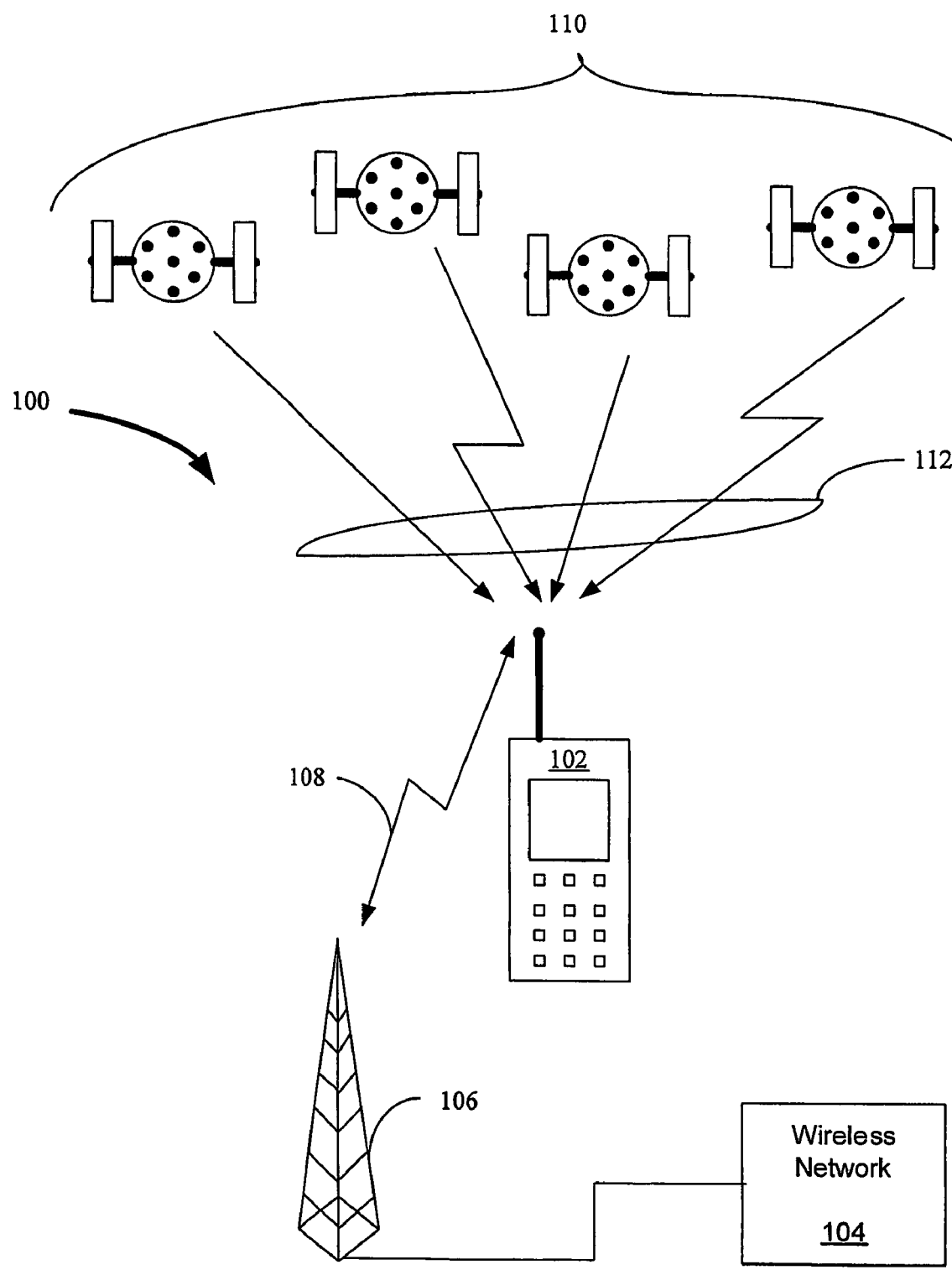
FIG. 1 is an example implementation of a GPS system using a wireless device having a GPS receiver located within the wireless device.

FIG. 1 is an example implementation of a GPS system 100 using a wireless device 102 having a GPS receiver (not shown) located within the wireless device 102. As shown in FIG. 1, during operation, the wireless device 102 is in signal communication with a wireless network 104 via a basestation 106 and wireless transmission path 108 and is in signal communication with at least one satellite of the GPS satellite constellation 110 via signal communication path 112.

The wireless device 102 includes both a GPS receiver (not shown) and a wireless processing section (not shown). The GPS receiver within the wireless device 102 may receive GPS signals from the GPS satellite constellation 110 via signal communication path 112 and the wireless processing section of the wireless device 102 may receive wireless communication signals from the wireless network 104 via signal communication path 108 and base station 106. In some implementations, the wireless device 102 may also send wireless communication signals to the wireless network 104 via signal communication path 108 and base station 106. The wireless device 102 may be a wireless handset such as a cellular telephone (also known as a cellphone, mobile telephone or mobile phone) or any other type of mobile device, including, but not limited to, personal digital assistants (PDAs), pagers, computer, two-way radio, trunked radio, specialized mobile radio (SMR) or any other device for which it is desirable to determine location information. In the case of a cellular telephone, the wireless device 102 may utilize a cellular transceiver that operates at any radio frequency (RF) band utilizing any transmission schemes including but not limited to CDMA, CDMA-2000, W-CDMA, TDMA, FDMA, GSM, UMTS, AMPS, Bluetooth, Wi-Fi and/or any combination or extension of these transmission schemes or similar schemes.

Figure 2:
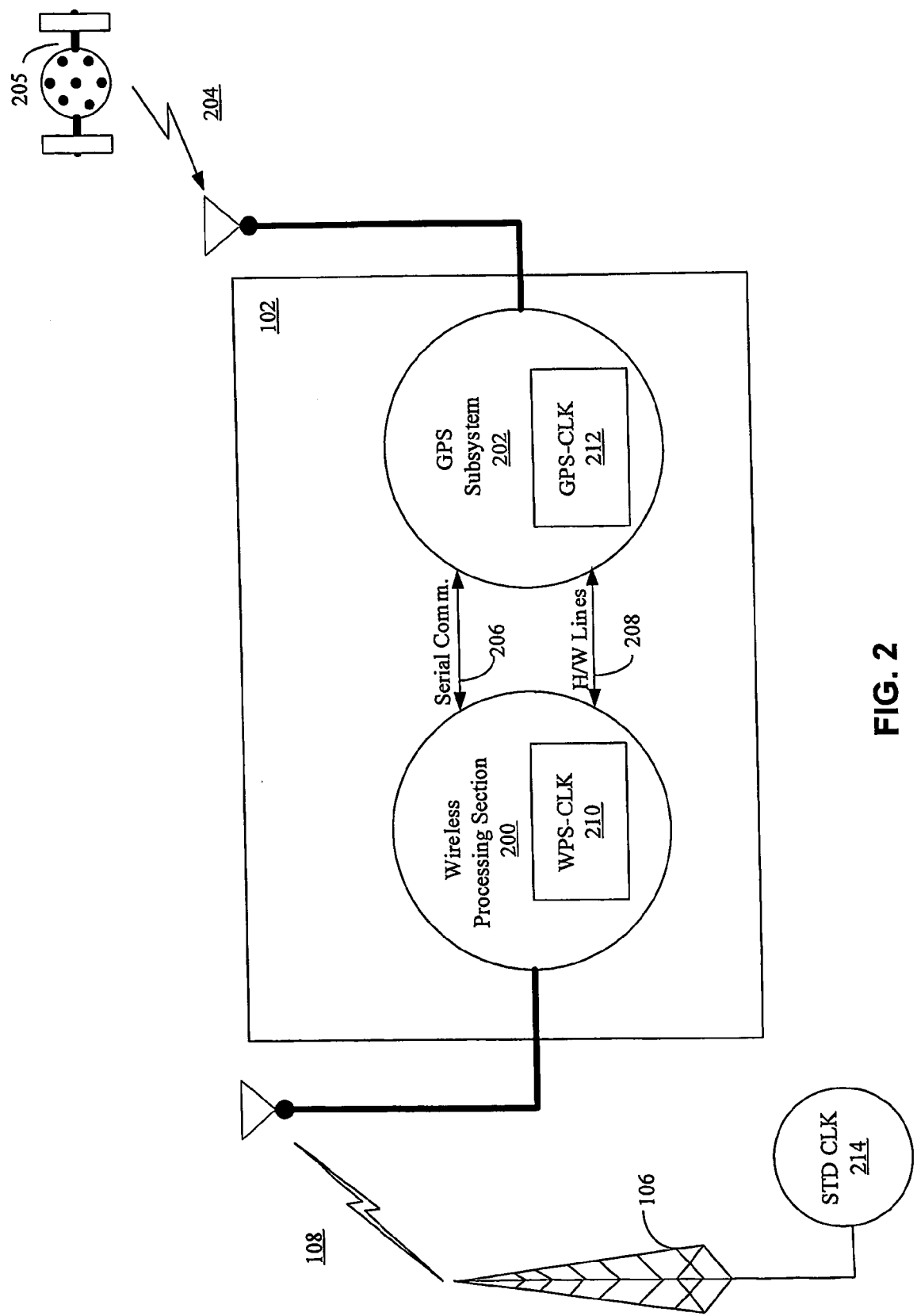
FIG. 2 is an example implementation of a block diagram of the wireless device shown in FIG. 1.

FIG. 2 is an example implementation of a block diagram of the wireless device 102 shown in FIG. 1. As seen in FIG. 2, the wireless device 102 includes both a wireless processing section 200 and a GPS subsystem 202. The wireless processing section 200 performs the processing functions for the wireless applications and may include a wireless transceiver. For example, in the case of a cellular telephone, the wireless device 102 would include a call processing section with a cellular transceiver. The GPS subsystem includes a GPS receiver (not shown) for receiving satellite transmissions 204 from satellites 205 and a GPS engine (not shown) that performs the position computation functions for the wireless device 102. By integrating the technology of the wireless device 102 with that of the GPS subsystem 202, the wireless device 102 provides two major service systems: that of a wireless device, such as cellular telephone service, and that of the GPS receiver to provide location information of the wireless device 102. It is appreciated by those skilled in the art that this integration provides for numerous advantages including meeting the E911 requirements of the Federal Communication Commission (FCC).

Within the wireless device 102, or, alternatively, between the wireless device 102 and an external accessory device (not shown) to the wireless device 102, communications between the wireless processing section 200 and GPS subsystem 202 take place. These communications allow signals to be transferred from the wireless processing section 200 to GPS section 202, and may take place on a serial or parallel communications link 206 (such as RS-232 serial communication link) and hardware lines 208, but other connections may be also utilized if desired.

For example, in another example implementation, the wireless processing section 200 and the GPS subsystem 202 may share the same digital processor (not shown) and/or other circuitry. In such a case, the communication between the wireless processing section 200 and the GPS subsystem 202 may be made by inter-task communication, and certain data transfers, such as any time or frequency transfers between the wireless processing section 200 and the GPS subsystem 202, would not use hardware lines 208, but would be internal to the circuitry or, potentially, no transfer would be required depending on the circuit design.

As illustrated by FIG. 2, the GPS satellites 205 transmit spread spectrum signals 204 that are received at the wireless device 102. For purposes of illustration, satellite 205 represents a constellation of satellites 205 in the GPS system. If the wireless device 102 is capable of receiving strong enough signals 204, the GPS subsystem 202 in the wireless device 102 can compute the position of the wireless device 102 as is typically done in a standalone GPS system. Oftentimes, however, the GPS subsystem 202 is not able to receive strong enough signals 204, or is not able to receive signals 204 from enough available GPS satellites 205 to autonomously compute the position of the wireless handset 102. This results in high time to first fix (TTFF) values. The wireless devices 102 may still, however, be able to communicate to the base station 106. Thus, the base station 106 can communicate information via signals 108 to wireless device 102 that allow the wireless device 102 to improve its TTFF and compute its location, or in certain applications (although not required for the implementation of the invention) to communicate information from the wireless device 102 to the base station 106, to allow a server (not shown) at the wireless network 104, in signal communication with the base station 106, to compute the position of the wireless device 102. When the base station 106 transmits information to the wireless device 102 to allow the wireless device 102 to compute its position, it is typically known as "aided GPS."

As further illustrated by FIG. 2, the base station 106 and both the wireless processing section 200 and the GPS subsystem 202 of the wireless device 102 have internal clocks that are produced by internal clock circuits. For illustrative purposes, the clock of the wireless processing section 200 shall be referred to as the "WPS-CLK" 210 and the clock of the GPS subsystem 202 shall be referred to as the "GPS-CLK" 212. Typically, the WPS-CLK 210 and GPS-CLK 212 are inexpensive clocks produced by crystal oscillators that are not highly accurate when compared to the atomic clocks of the GPS satellites 205. Thus, to reduce the TTFF and accurately calculate the position of the wireless device 102, the error in the GPS-CLK 212 should be accounted for. In contrast to the WPS-CLK 210 and GPS-CLK 212, the base station 106 clock is a highly accurate. In the case of a CDMA wireless network, the base station 106 clock would be synchronized with the atomic clocks of the GPS satellites 205. For purposes of illustration, this base station 106 clock shall be referred to as the "BS-CLK" 214 or the "Standard Clock" (STD-CLK) 214. In operation, the STD-CLK 214 is transmitted, via signal communication path 108, to the wireless processing section 200 of wireless handset 102. As explained in more detail below, the wireless processing section 200 of the wireless handset 102 calculates a first offset value (referred to as "STD-WPS-OFFSET") that corresponds to the difference in frequency between the STD-CLK 214 and that WPS-CLK 210. The STD-WPS-OFFSET is then communicated to the GPS subsystem 202, which uses the STD-WPS-OFFSET, along with WPS-CLK 210 and GLS-CLK 212 to estimate a second offset value (referred to as "GPS-STD-OFFSET") between the GPS-CLK 212 and that of the STD-CLK 214. The GPS-STD-OFFSET is then utilized by the GPS subsystem 202 to acquire the received GPS signals from the GPS satellites 204.

Figure 3:
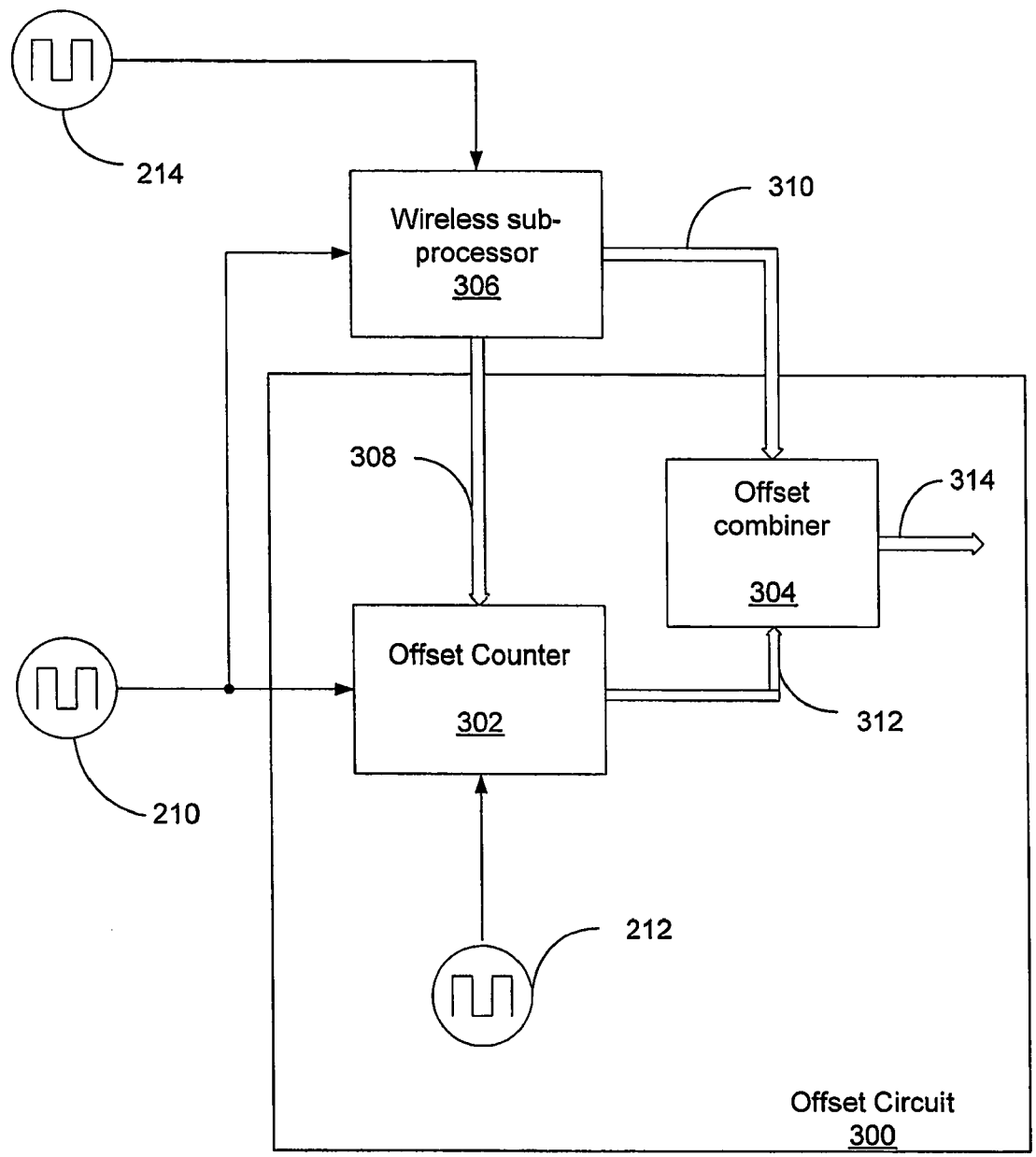
FIG. 3 is general block diagram of an offset circuit within the GPS subsystem shown in FIG. 2 for generating GPS-STD-OFFSET.

FIG. 3 is general block diagram of an offset circuit 300 within the GPS subsystem 202 shown in FIG. 2 for generating GPS-STD-OFFSET. The offset circuit 300 may include an offset counter 302 and an offset combiner 304 in signal communication with the offset counter 302. The offset circuit 300 is in signal communication with a wireless sub-processor 306 located in the wireless processing section 200. The wireless sub-processor 306 receives the STD-CLK 214 and WPS-CLK 210, and in response produces a WPS initialization message that includes information about the nominal frequency (referred to as "N-WPS-CLK") of the WPS-CLK 210 and a WPS periodic message that includes information about the STD-WPS-OFFSET. The N-WPS-CLK information is passed to the offset counter 302 via first offset bus 308 and the STD-WPS-OFFSET is passed to the offset combiner 304 via the second offset bus 310. The offset counter 302 receives the N-WPS-CLK information via first bus 308, GPS-CLK 212 and WPS-CLK 210. In response, the offset counter 302 generates an offset signal (or message) that includes information about the difference in frequency between WPS-CLK 210 and GPS-CLK 212 (referred to as "GPS-WPS-OFFSET") and passes that offset signal to the offset combiner 304 via third offset bus 312. The offset combiner 304 then combines the information for the STD-WPS-OFFSET and GPS-WPS-OFFSET and produces the STD-GPS-OFFSET which is passed to the rest of the GPS subsystem 202 via message bus (or signal path) 314.

Figure 4:
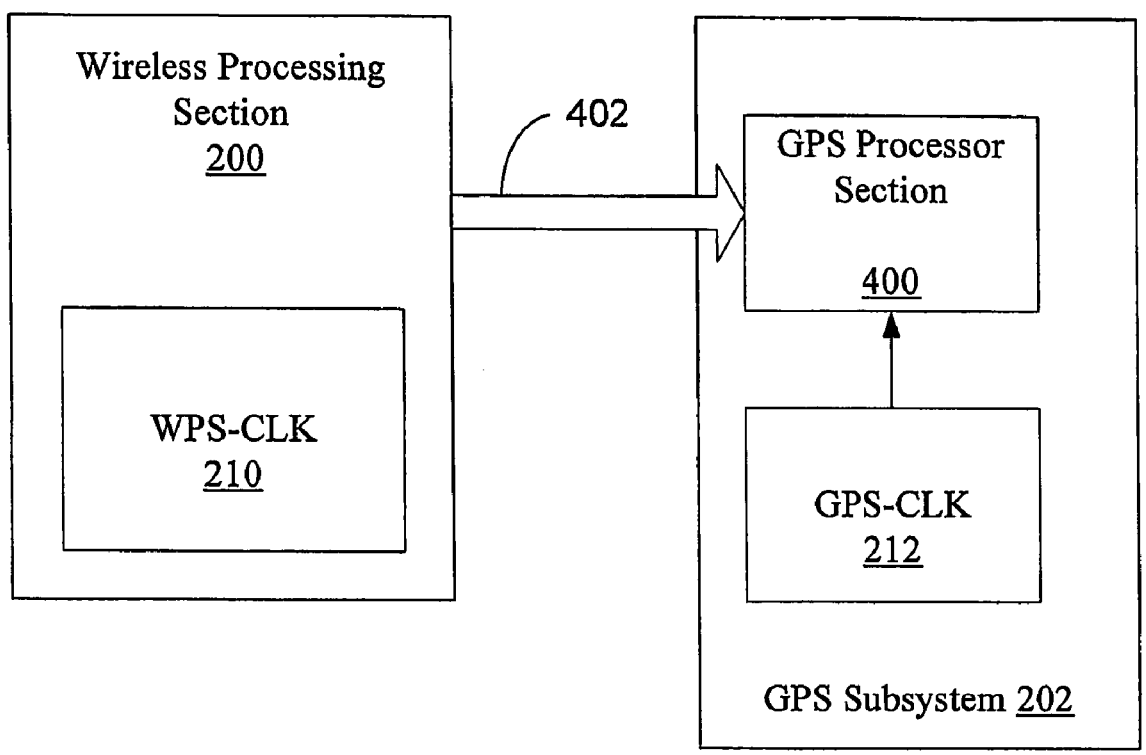
FIG. 4 illustrates a basic block diagram of the GPS subsystem of FIG. 2.

FIG. 4 illustrates a basic block diagram of the GPS subsystem 202 of FIG. 2. In FIG. 4, the GPS subsystem 202 includes the GPS-CLK 212 and a GPS processor section 400 that receives at least one signal from the wireless processing section 200 via signal bus 402. The wireless processing section 200 receives communication data from the wireless network 104 (FIG. 1) including STD-CLK 214 (FIG. 2). The wireless processing section 200 then generates the STD-WPS-OFFSET message that represents the frequency difference between the WPS-LO 210 and the STD-CLK 214. The STD-WPS-OFFSET message is transferred to the GPS processor section 400 via signal bus 402. The GPS processor section 400, in response to receiving the STD-WPS-OFFSET and the GPS-CLK 212, generates a STD-GPS-OFFSET that assists in the acquiring of the received GPS satellite signals when input into an acquiring unit (not shown) within the GPS processor section 400.

Figure 5:
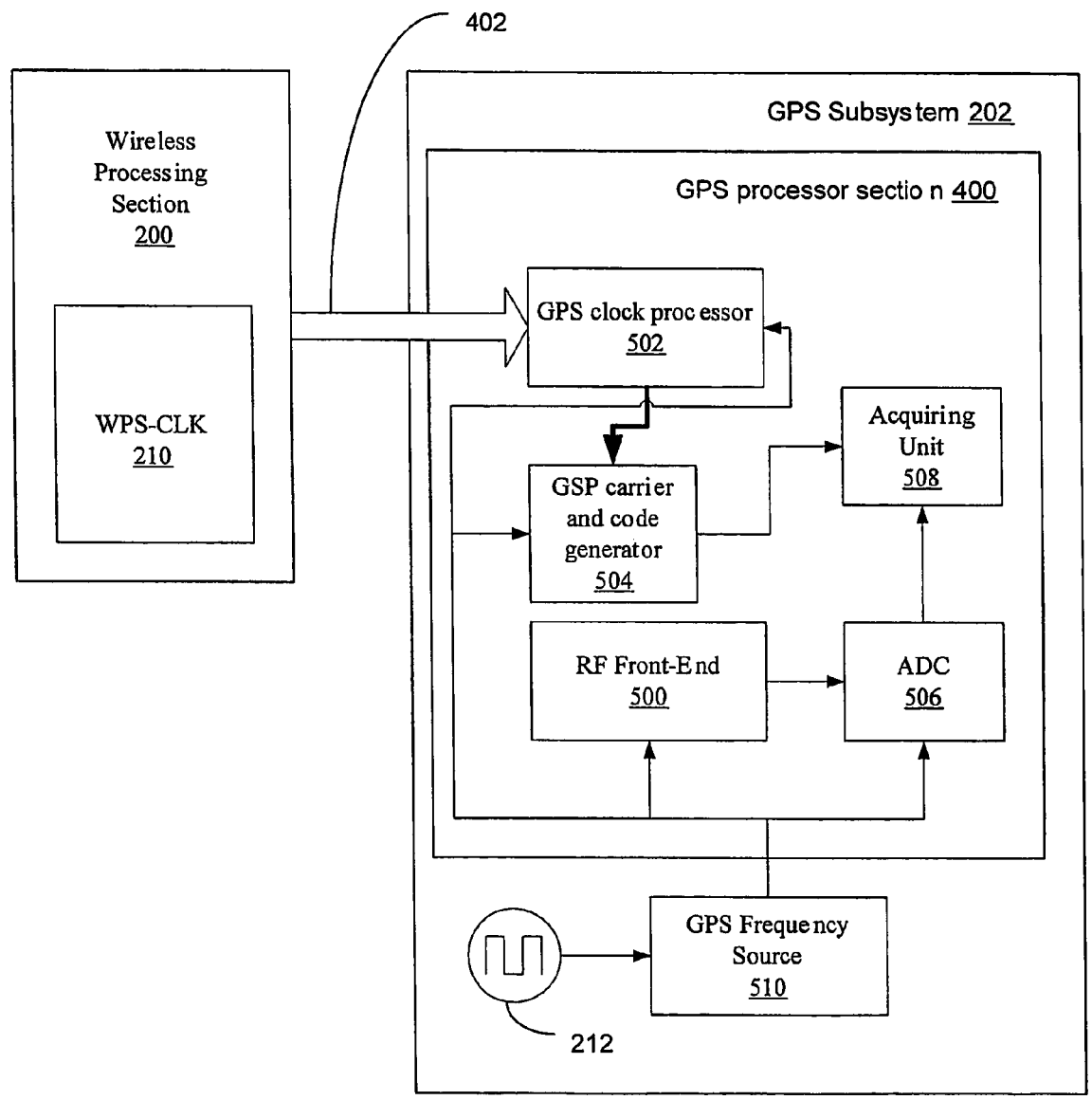
FIG. 5 is a block diagram of an example implementation of the GPS processor section of FIG. 4.

FIG. 5 is a block diagram of an example implementation of the GPS processor section 400 of FIG. 4. As shown in FIG. 5, the GPS processor section 400 may include a radio frequency (RF) front-end 500, GPS clock processor 502, GPS code and carrier generator 504, analog-to-digital converter (ADC) 506 and acquiring unit 508. A GPS frequency source 510 sends a frequency reference to the RF front-end 500, GPS code and carrier generator 504 and ADC 506. The RF front-end 500 may be a standard GPS RF front-end. In operation, the RF front-end 500 receives the GPS satellite signals and demodulates (also known as downconverting) them to remove the carrier frequency from the data transmitted on the GPS satellite signals. The demodulation is accomplished by mixing the received GPS satellite signals with the GPS frequency source 510. The resulting demodulated GPS satellite signals are then passed from the RF front-end 500 to the ADC 506. At the ADC 506, the demodulated GPS satellite signals are typically digitized into a bit-stream of samples by a number of well-known sampling techniques. The resultant bit-stream of samples is then transferred to the acquiring unit 508. It is appreciated by one skilled in the art that the GPS frequency source 510 may be a local oscillator (LO) (not shown) that includes a voltage-controlled oscillator (VCO) (not shown) or voltage-controlled crystal oscillator (VCXO) (not shown) in a phase-locked loop (PLL) (not shown) that is locked to GPS-CLK 212 by many well known techniques.

The acquiring unit 508 receives the bit-stream of samples from the ADC 506 finishes demodulating the bit-stream of samples (if the RF front-end 500 only downconverted the received satellite signals into an intermediate frequency "IF") and decodes it by typically utilizing a bank of correlators (not shown) or a matched filter (not shown). If the acquiring unit 508 downconverts the bit-stream of samples from the IF frequency, the acquiring unit 508 may have a mixing stage that mixes a Doppler corrected frequency signal from the GPS code and carrier generator 504 with the bit-stream of samples. The result from the mixer would be a new bit-stream of samples corrected for carrier Doppler shift.

The correlators or matched filter correlate the bit-stream of samples from the ADC 506 with the different satellite codes PN codes. The acquiring unit 508 produces a detection signal when the corresponding PN code of a satellite is correlated against the bit-stream samples of the received satellite signal.

The PN codes are produced by the GPS code and carrier generator 504. The GPS code generator 504 may include a numerically controlled oscillator (NCO) (not shown) that produces a PN code and other circuitry (not shown) that corrects for Doppler shift both for the carrier and code. The GPS clock processor 502 is capable of determining the STD-GPS-OFFSET. Once the STD-GPS-OFFSET has been generated by the GPS clock processor 502, it is passed to the GPS code and carrier generator 504. The GPS code and carrier generator 504 then combines the STD-GPS-OFFSET with the corrections for Doppler shift and utilizes the combined result to remove the IF carrier and produce the PN codes for the acquiring unit 508.

The GPS code and carrier generator 504 attempts to correct the effects of Doppler shift in both the carrier and the code of the received satellite signal. In general, satellite motion has an impact on the processing of the signals at the GPS receiver because the input frequency shifts as a result of the Doppler effect. The satellite motion causes a Doppler frequency shift on the carrier frequency and on the coarse/acquisition (C/A) code. The angular velocity and speed of the satellite can be calculated from the approximate radius of the satellite orbit and is approximately $1.458 \times 10^{-4}$ radians/second and 3,874 meters/second. The Doppler frequency shift is caused by the satellite velocity component toward the GPS receiver. Typically, the maximum Doppler velocity occurs when the satellite is at the horizon position and from the orbit speed the maximum Doppler velocity along the horizontal direction is approximately 2,078 miles per hour. This speed is equivalent to a high-speed military aircraft. Therefore, the Doppler frequency shift caused by a land vehicle is often very small, even if the motion is directly toward the satellite to produce the highest Doppler effect. For the L1 frequency, which is modulated by the C/A signal, the maximum Doppler frequency shift is approximately 4.9 KHz. Therefore, for a stationary observer, the maximum Doppler frequency shift is around ±5 KHz. To create a Doppler frequency shift of ±5 KHz by the vehicle alone, the vehicle must move toward the satellite at about 2,078 miles/hour. As such, if the GPS receiver is used in a low-speed vehicle, the Doppler shift can be approximated as ±5 KHz.

Figure 6:
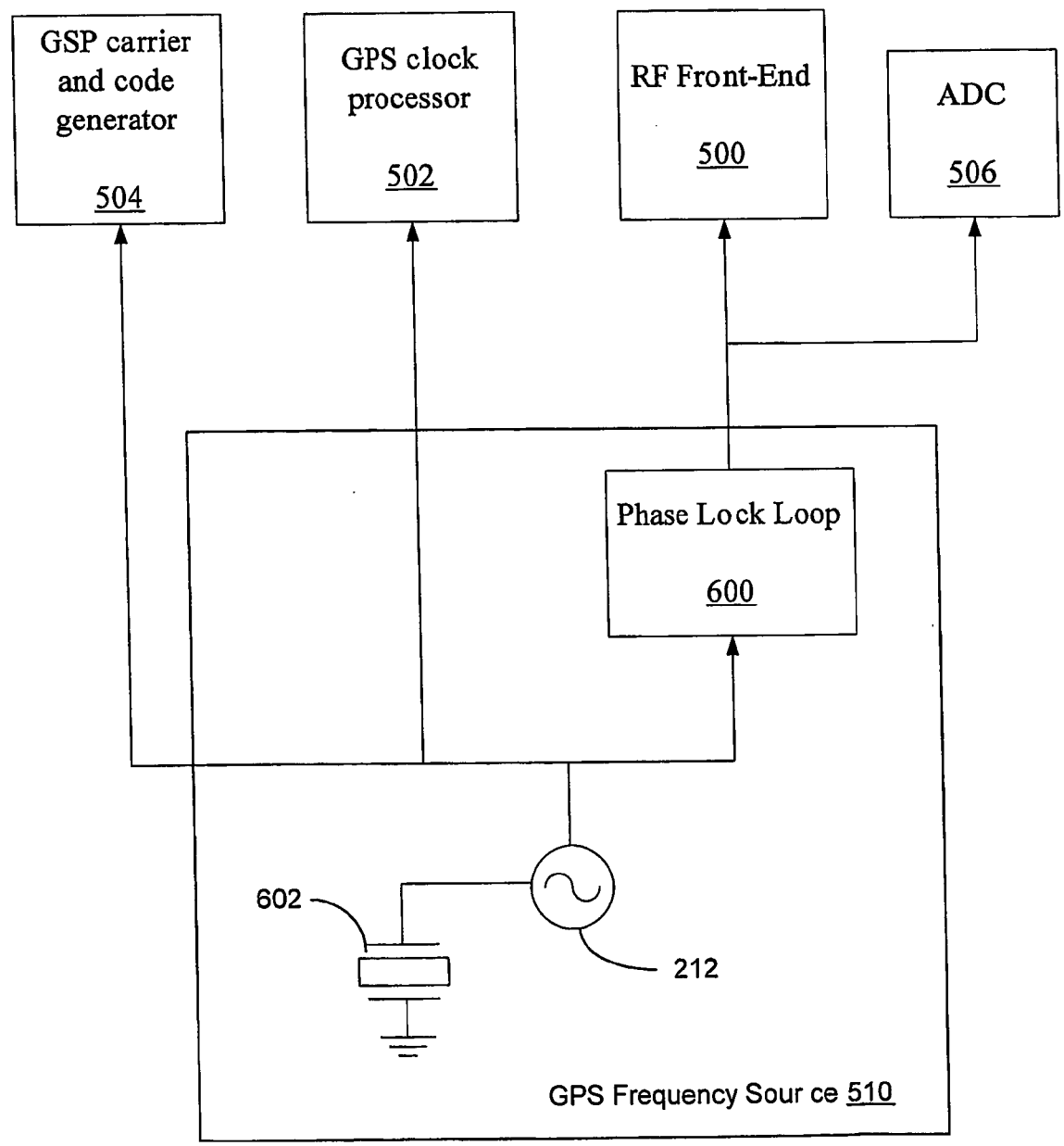
FIG. 6 is a block diagram of an example implementation of the GPS frequency source.

FIG. 6 is a block diagram of an example implementation of the GPS frequency source 510 of FIG. 5. The GPS frequency source 510 may include the GPS-CLK 212 and a PLL 600. It is appreciated that typically the GPS-CLK 212 may be produced by a timing circuit (not shown) with a crystal oscillator 602. The PLL 600 may be implemented by a number of approaches that are well known to one of ordinary skill in the art. As an example, the basic components of the PLL 600 include a phase detector (not shown), a loop filter (not shown) and a VCO (not shown) whose frequency is controlled by an external voltage and that is locked on to frequency of the GPS-CLK 212. In this example implementation, the GPS carrier and code generator 504 and the GPS clock processor 502 use the GPS-CLK 212 as the base reference and generate their own respective frequencies. The RF front-end 500 and ADC 506 use the frequency from the PLL 600 because they are typically related in a synchronous manner or use frequency values that are multiples of one another.

Figure 7:
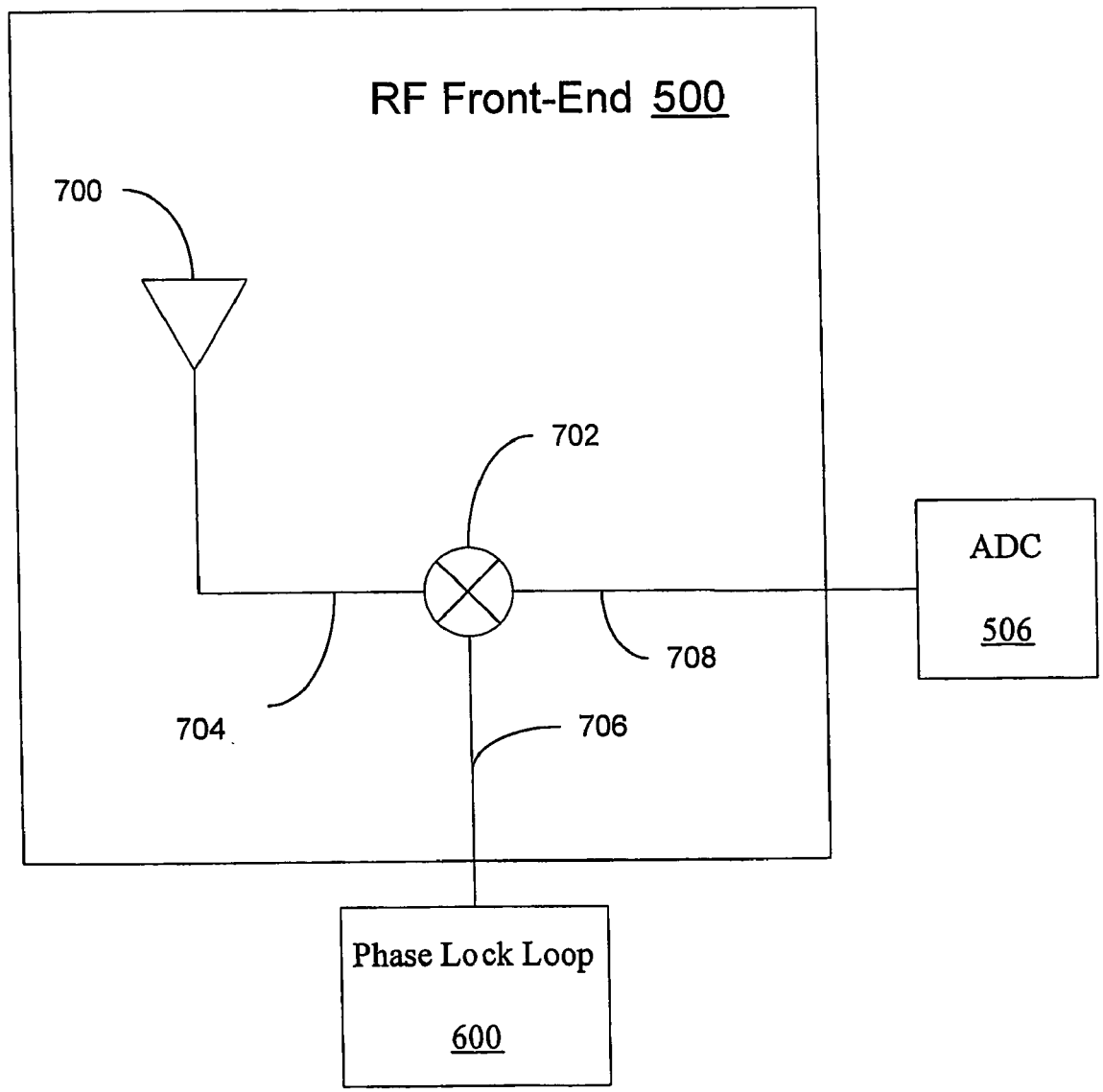
FIG. 7 is a simplified block diagram of an example implementation of the GPS RF front-end utilizing direct conversion.

FIG. 7 is a simplified block diagram of an example implementation of the GPS RF front-end 500 utilizing direct conversion. The RF front-end 500 may include an antenna 700 and a mixer 702. The mixer 702 is in signal communication with the PLL 600 and ADC 506. The mixer 702 is basically multiplier that demodulates (or downconverts, i.e., removes the carrier frequency signal) a received satellite signal, on signal path 704, by taking a product of the received satellite signal with the frequency signal provided by the PLL 600. If the frequency of the received satellite signal carrier 704 and the frequency of the PLL 600 are synchronous, i.e., are of the same frequency, the output of the mixer is a direct current (DC) component signal with a second order harmonic that may be filtered out with a low pass filter (not shown). As an example, if the signal on signal path 704 is "$x(t)\cos(\omega t)$," where "$\omega$" is the angular frequency and "t" is the time, and the PLL 600 produces a demodulation signal 606 of "$\cos(\omega t)$" that is fed into the mixer 702, the resulting output 708 of the mixer would be $x(\omega t)\cos^2(\omega t)$ which equals $$\frac{x(t)}{2}(1+\cos(2\omega t)) \text{ or } \frac{x(t)}{2}+\frac{\cos(2\omega t)}{2}.$$

If the frequency of the received satellite signal carrier 704 and the frequency of the PLL 600 are not synchronous, then there is no DC component. As another example, if the signal on the signal path 704 is "$x(t)\cos(\omega t)$" and the PLL 600 produces a demodulation signal 606 "$\cos(\omega_1 t)$," the resulting output 608 of the mixer would be $x(t)\cos(\omega t)\cos(\omega_1 t)$. If "$\omega_1$" is close to $\omega$ but off by a small amount "$\Delta\omega$," the relationship may be represented as $\omega=\omega_1\pm\Delta\omega$. In this case, $x(t)\cos(\omega t)\cos(\omega_1 t)$ would equal $x(t)\cos(\omega t)\cos(\omega t\pm\Delta\omega t)$. This problem may be overcome by adjusting the frequency of the PLL 600 to be synchronous with the satellite signal carrier frequency. Adjusting for frequency at the PLL 600 does not, however, account for Doppler shift, which also affects the perceived frequency of the received satellite carrier signal in a dynamic fashion. Rather than correcting for frequency at the demodulating stage at the RF-front end, the correction could be made at the acquiring stage, i.e., at the acquiring unit 508, which would include the correction for Doppler shift.

Figure 8:
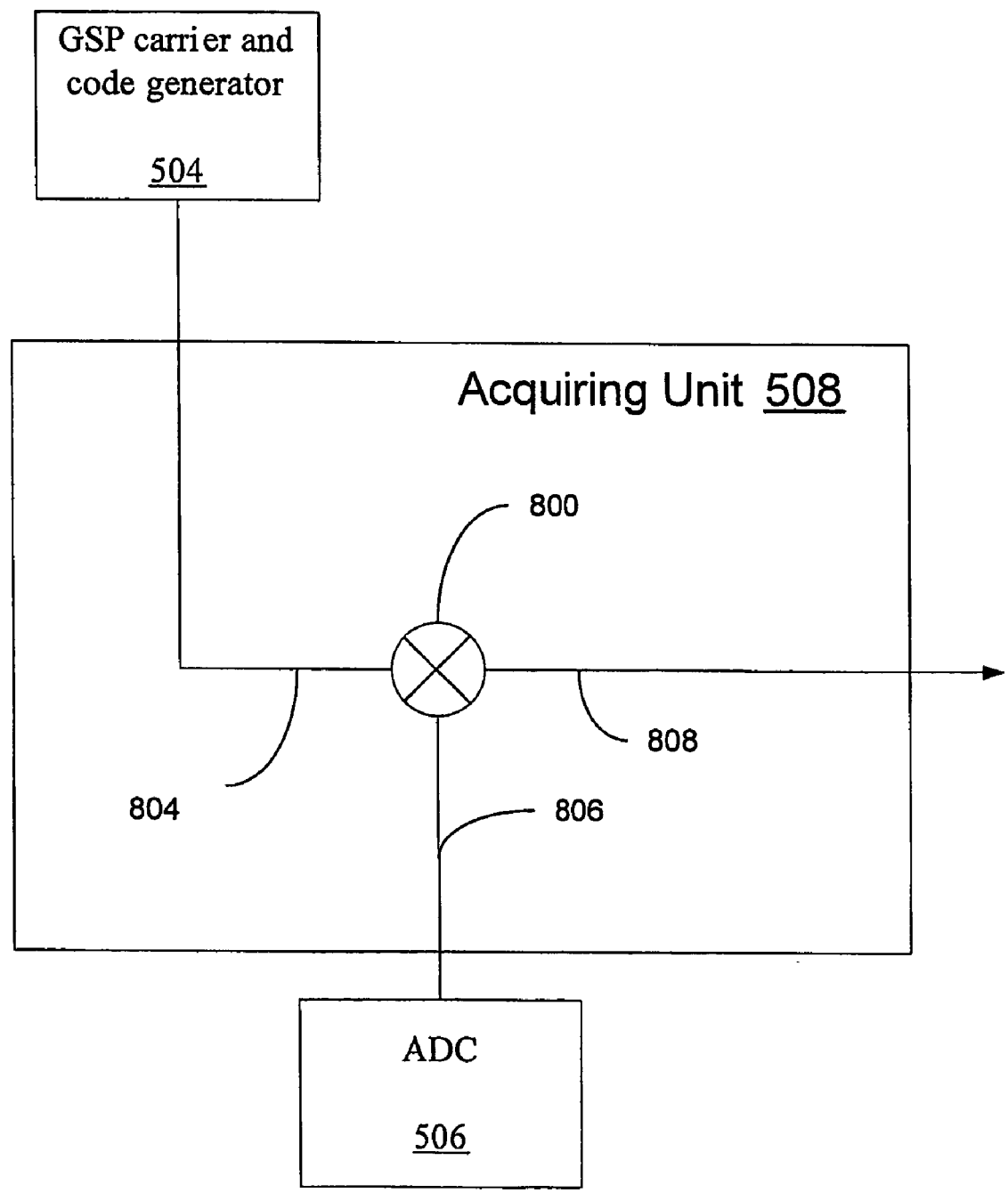
FIG. 8 illustrates a simple block diagram of an example implementation of the acquiring unit.

FIG. 8 illustrates a simple block diagram of an example implementation of the acquiring unit 508. At the acquiring unit 508 the Doppler shift error and PLL 600 are corrected by an adjustment in the GPS code and carrier generator 504 and in a change in frequency generated by the PLL 600. The acquiring unit 508 may include a plurality of correlators or matched filters. For simplicity, the acquiring unit 508 is illustrated with one correlator 800, however it is appreciated by one skilled in the art that numerous banks of correlators will most likely be present. In operation, the acquiring unit 508 receives from the ADC 506 a bit-stream of samples possibly corresponding to a received satellite signal. The acquiring unit 508 places the bit-stream of samples into a bank of correlators or matched filters and receives a PN code from the GPS code and carrier generator 504. The PN code is then shifted through the bank of correlators and an output is produced that signifies when a satellite signal has been received by the wireless device 102. Typically, the PN code received from the GPS code and carrier generator 504 has been adjusted to compensate for any Doppler shift for the respective satellites. However, in this situation the GPS code and carrier generator 504 and the PLL 600 has also compensated for any frequency errors in the GPS-CLK 212.

Figure 9:
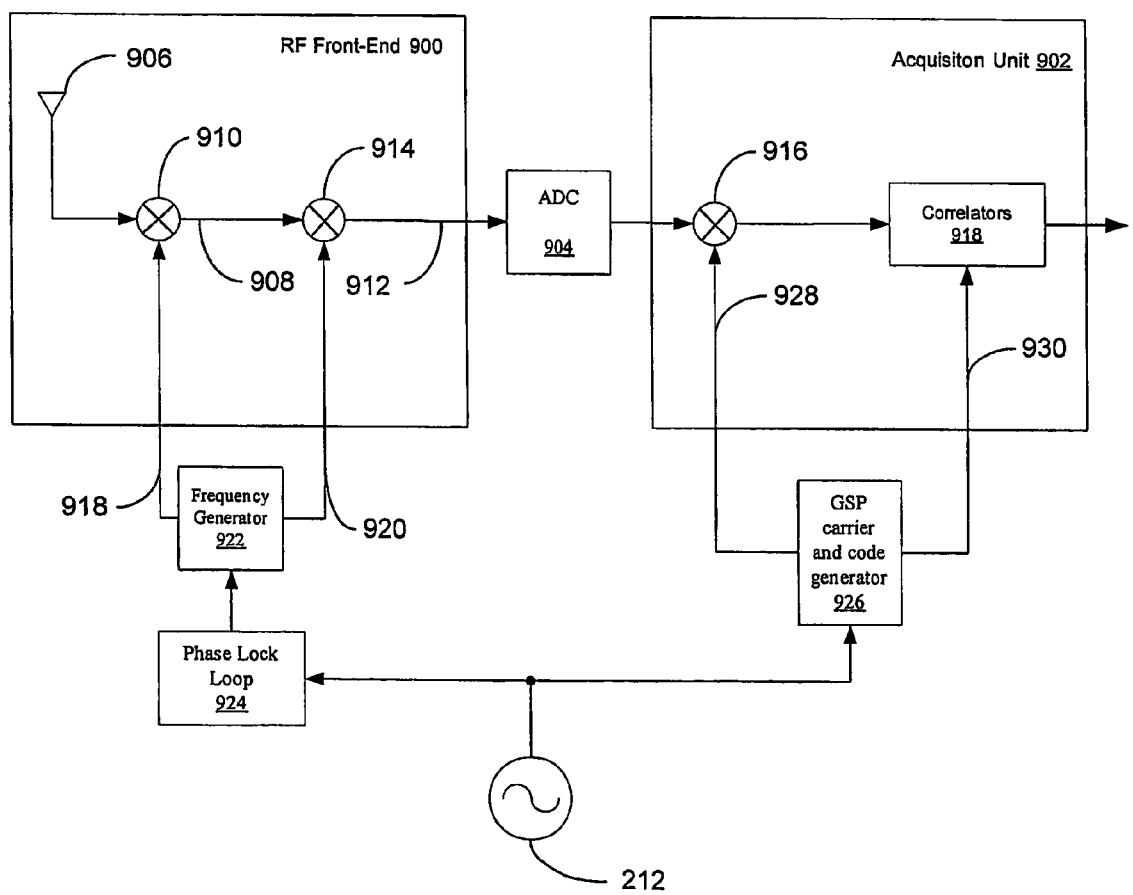
FIG. 9 shows a block diagram for another example implementation of the RF front-end and the acquisition unit, which is in signal communication with the RF front-end via the ADC.

FIG. 9 shows a block diagram of another example implementation of the RF front-end 900 and the acquisition unit 902, which is in signal communication with the RF front-end 900 via the ADC 904. In this example, the RF front-end 900 is a multi-stage receiver that first downconverts a received satellite signal at the antenna 906 to an intermediate frequency (IF) signal 908, such as 96 KHz, via mixer 910 and then to a baseband (i.e., demodulate to zero) signal 912 via mixer 914. The baseband signal 912 may then be passed through the ADC 904 to the acquisition unit 902. In the acquisition unit 902, the ADC sample baseband signal is corrected for Doppler carrier shift via mixer 916 and passed to a bank of correlators 918 or a matched filter (not shown). The frequency sources 918 and 920 may be produced by frequency generator 922 that either multiplies or divides (in any one of many well known techniques) the frequency signal produced by the PLL 924 which is locked to the GPS-CLK 212. Similarly, the GSP carrier and code generator 926, which utilizes the GPS-CLK 212, may produce signals 928 and 930 that compensate for the carrier Doppler shift and drive the correlators 918 or matched filer (not shown).

Figure 10:
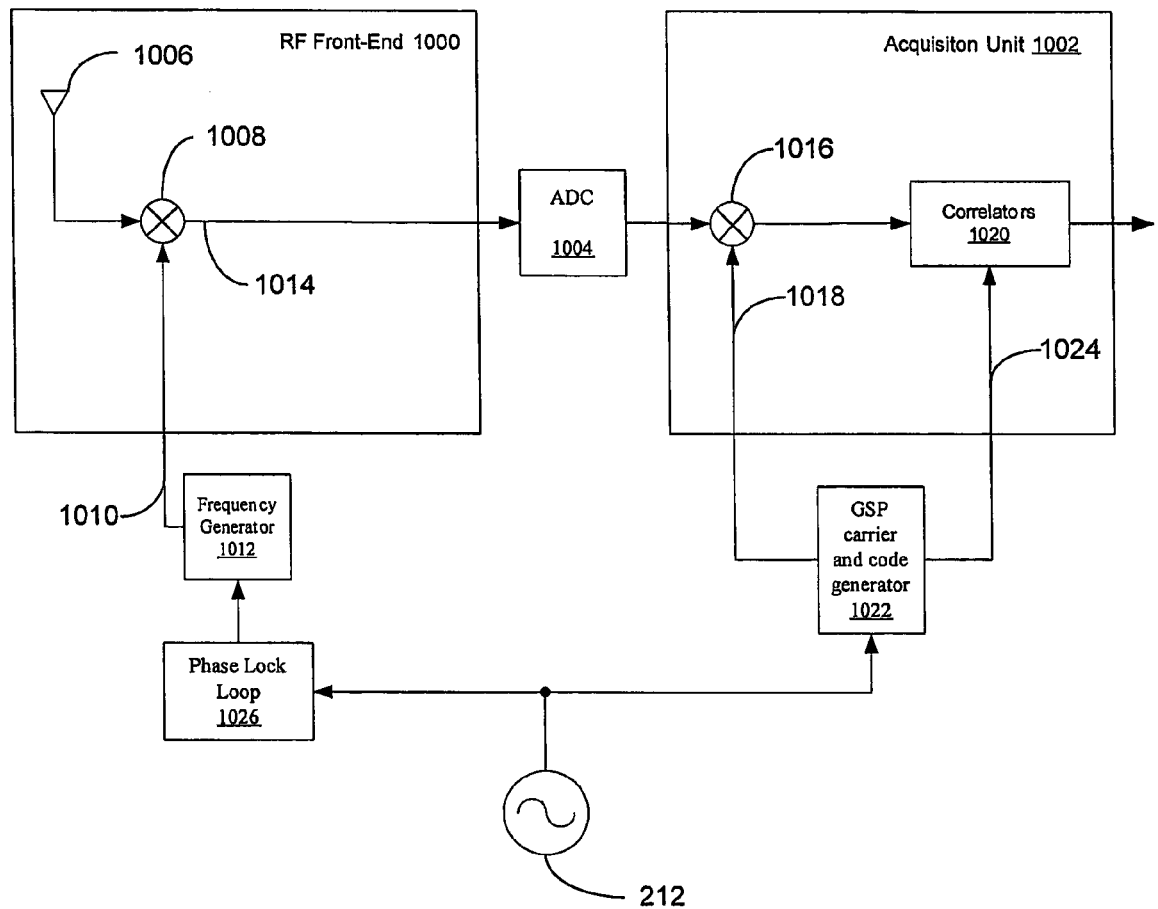
FIG. 10 shows a block diagram for yet another example implementation of the RF front-end and the acquisition unit, which is in signal communication the RF front-end via the ADC.

FIG. 10 shows a block diagram for yet another example implementation of the RF front-end 1000 and the acquisition unit 1002, which is in signal communication the RF front-end 1000 via the ADC 1004. In this example the RF front-end 1000 only has mixer stage. The received satellite signal is received at antenna 1006 and mixed with an IF frequency 1008 at mixer 1010. The IF frequency 1008 is produced by frequency generator 1012 and it mixes with the received satellite signal in mixer 1010 to downconvert the received satellite signal to an intermediate downconverted signal 1014 such as 96 KHz. The intermediate downconverted signal 1014 is passed through the ADC 1004 to the acquisition unit 1002. The ADC 1004 digitizes the intermediate downconverted signal in a bit-stream of samples and passes it to the acquisition unit 1002. At the acquisition unit 1002, the bit-stream of samples are feed into a second mixer 1016 which mixes the samples with a carrier Doppler corrected signal 1018 which produces a downconverted bit-stream of samples that have been corrected for carrier Doppler shift. The output of mixer 1016 is feed into a bank of correlators 1020 or matched filters and produces a detection signal if a satellite has been acquired. As before, the frequency generator 1012 is related to the PLL frequency 1026 and both the PLL and GPS carrier and code generator 1022 are related to the GPS-CLK 212.

Figure 11:
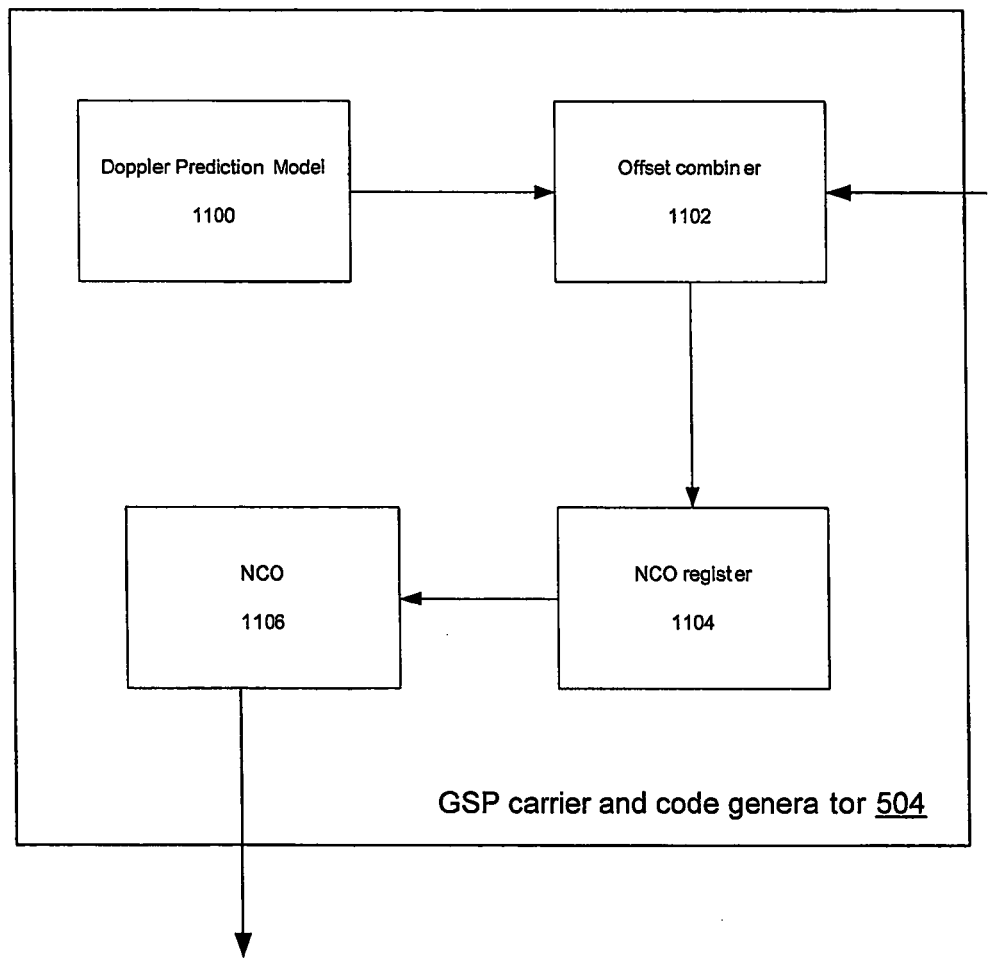
FIG. 11 shows a block diagram for an example implementation of the GPS carrier and code generator.

FIG. 11 shows a block diagram for an example implementation of the GPS carrier and code generator 504. The GPS carrier and code generator 504 may include a Doppler prediction model 1100, an offset combiner 1102, a NCO register 1104 and a NCO 1106. In operation, the Doppler prediction model 1100 produces a number of Doppler correction values that are combined with the STD-GPS-OFFSET. These correction values are input into the NCO register 1104 that controls the NCO 1106. The NCO 1106 then sends the Doppler corrected carrier signal and PN code to the acquisition unit 508.

Figure 12:
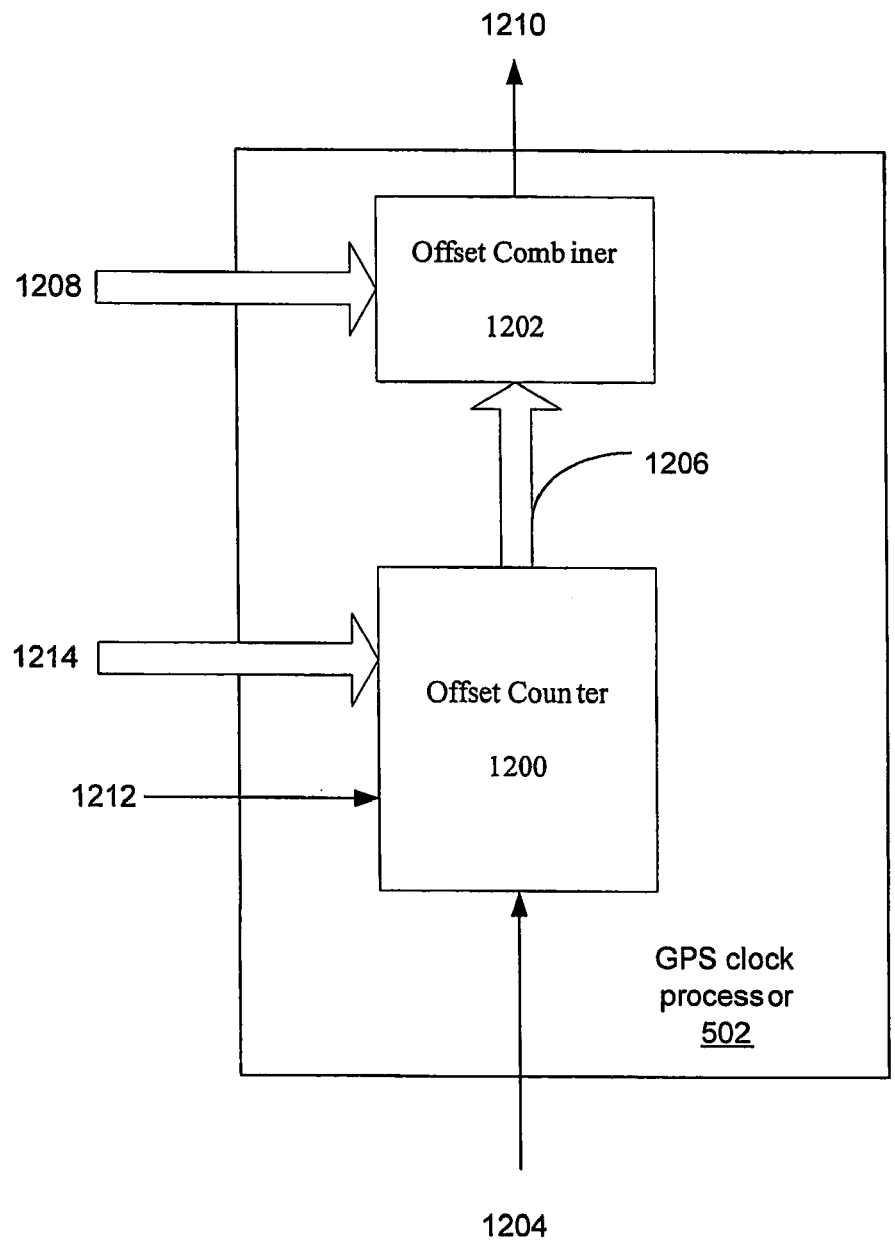
FIG. 12 shows a block diagram of an example implementation of the GPS clock processor.

FIG. 12 shows a block diagram of an example implementation of the GPS clock processor 502. The GPS clock processor 502 may include an offset counter 1200 and an offset combiner 1202. As an example, the offset counter 1200 may receive a signal 1204 from the GPS-CLK 212 and at least one signal 1212 from the wireless processing section 200. The offset counter 1200 then produces an offset signal that represents GPS-WPS-OFFSET. The offset signal may be transmitted as a message via signal path 1206 to the offset combiner 1202. The offset combiner 1202 then combines the information from the offset signal received, via signal path 1206, with a message received from the wireless processing section 200, via signal path 1208, that represents STD-WPS-OFFSET. The output of the offset combiner 1202 is an offset signal 1210 that represents STD-GPS-OFFSET. This offset signal 1210 is input into the combiner 1102 of FIG. 11.

As an example of operation, the offset counter 1200 is utilized to measure the relative frequency offset between the WPS-CLK 210 and GPS-CLK 212. A gate signal to the offset counter 1200 may be generated by the GPS-CLK 212 via signal path 1204. The pulse width, which may also be referred to as gate time, is determined by counting a fixed number of GPS-CLK 212 clock pulses. The offset counter 1200 also receives, via signal path 1212, the WPS-CLK 210. The offset counter 1200 then counts the pulses from the WPS-CLK 210 clock during the gate time. In general, the offset counter 1200 should count number WPS-CLK 210 clock pulses (the "predicted count" or "count predicted") to be equal to the frequency of the WPS-CLK 210 multiplied by the gate time or in other words: count_predicted=frequency×gate_time.

For example, the offset counter 1200 should accumulate 25 million pulses from a frequency source, such as an oscillator, with a hypothetical WPS-CLK 210 frequency of 25 MHz during a one-second interval. Therefore, a frequency offset (freq_offset) may be determined as the quantity of the actual count reading (count_reading) minus the count predicted, the quantity divided by product of the WPS-CLK 210 frequency by the gate time. Written as a mathematical relationship the frequency offset is: freq_offset=(count_reading−count_predicted)/(frequency×gate_time).

It is appreciated by those of skill in the art, that in order to compute the predicted count, one needs the nominal GPS-CLK 212 and WPS-CLK 210 clock frequencies. The GPS-CLK 212 clock frequency is imposed via signal path 1204. To avoid a compilation time parameter in the GPS subsystem 202 source code, the wireless processing section 200 specifies the WPS-CLK 210 nominal frequency. Typically this is done by sending a periodic frequency calibration message that includes the WPS-CLK 210 nominal frequency parameter, N-WPS-CLK, from the wireless processing section 200 to the offset counter 1200 via signal path 1214. The GPS clock processor 502 may then compute the relative frequency error without prior knowledge of the WPS-CLK 210 clock characteristics.

To reduce the complexity of the offset counter 1200 hardware, the overall counting range of the offset counter 1200 may be much smaller than the total counting number, provided that the offset counter 1200 counts modulo its range, and its value range is smaller than the total range of the offset counter 1200. For example, if the total range is 5 parts per million (ppm), the WPS-CLK 210 frequency is 20 MHz, and the gating time is 1 second, the offset counter 1200 range may be as small as $5e^{-6}$ times $20e^{6}$=100.

The difference between the predicted count and the actual count reading is utilized to compute the GPS-CLK 212 frequency offset as follows. First, the difference between the predicted count and the actual count is not only due to the WPS-CLK 210 frequency error ($\delta f_{wps-lo}$), but also to the gate time error and offset counter 1200 resolution. Supposing the offset counter 1200 gate time is t seconds that is controlled by the GPS-CLK 212 clock, the error of gate time ($\delta t$) caused by the GPS-CLK 212 clock frequency ($\delta f_{gps-lo}$) is & $\delta t = \delta f_{gps-lo} \times t$. Then, the freq_offset=$\delta f_{wps-lo} + \delta f_{gps-lo}$+ counting_error/($t \times f_{wps-lo}$).

The value that the offset counter 1200 measures is ($\delta f_{gps-lo} + \delta f_{wps-lo}$). Theoretically, the GPS-CLK 212 clock cannot be calibrated better than WPS-CLK 210 clock and extending the gate time may improve the measurement accuracy of ($\delta f_{gps-lo} + \delta f_{wps-lo}$). However, using too long a gate time is typically impractical. Therefore, the minimum gate time is generally predetermined such that the relative frequency offset estimate error is within the desired design limits.

Figure 13:
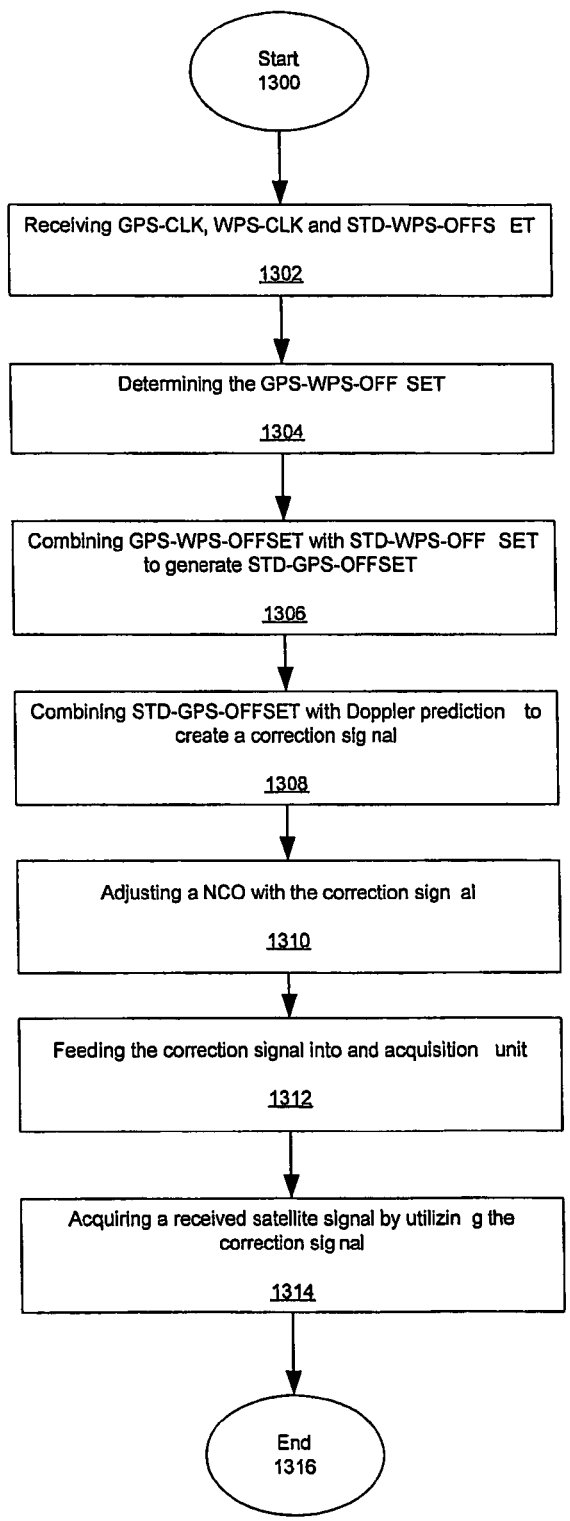
FIG. 13 is a flow chart illustrating the process preformed by the GPS subsystem.

FIG. 13 is a flow chart illustrating the process performed by the GPS subsystem 200. The process begins 1300 by GPS clock processor 502, FIG. 5, receiving 1302, FIG. 13, GPS-CLK, WPS-CLK and STD-WPS-OFFSET. Then the GPS clock processor 502 determines the GPS-WPS-OFFSET and combines 1306 the GPS-WPS-OFFSET with STD-WPS-OFFSET to generate STD-GPS-OFFSET. The STD- GPS-OFFSET is then passed to the GPS carrier and code generator 504 where the STD-GPS-OFFSET is combined 1308 with Doppler prediction to create a correction signal. The correction signal is used to adjust 1310 the NCO in the GPS carrier and code generator. The NCO output is then feed 1312 into the acquisition unit 508 and in response the acquisition unit acquires 1314 a received satellite signal using the correction signal. The process then ends 1316.

The process in FIG. 14 may be performed by hardware or software. If in hardware, the process may be performed by a controller (not shown) in either the wireless processing section 200 or GPS processor section 400. The controller may selectively be any general-purpose processor such as an Intel XXX86, Motorola 68XXX or PowerPC, or other equivalent or GPS and/or cellular specialized processor capable of running software instructions (not shown) resident on the controller. Alternatively, a GPS-specific circuit or oriented device may selectively also be utilized. It is appreciated that the controller may also be selectively integrated into a signal semiconductor chip such as an Application Specific Integrated Chip (ASIC) or Reduced Instruction Set Computer (RISC), or may be implemented via a Digital Signal Processor (DSP) chip.

If the process is performed by software, the software may reside in software memory (not shown) in the wireless device 102 (either in the wireless processing section 200 and/or GPS subsystem 202) or at a server on wireless 104. The software in software memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As previously discussed, the GPS system of the invention may be incorporated into any number of wireless mobile applications. Similarly, the GPS system can be used in connection with any number of geo-location services that have the capability to receive frequency information. Such GPS system can be used in connection with mobile devices that operate in network aided mode or network based services modes, or that operate in multi-mode, thereby having the ability to simultaneously switch between standalone mode, network aided mode, network based services, or other modes that allow the device to receive frequency information from the a secondary source, such as a base station.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An aided Global Positioning System (GPS) subsystem within a wireless device, wherein the wireless device has a wireless processing section having a wireless processing section clock, the wireless processing section capable of receiving signals from a wireless network including a network clock signal and capable of generating a first offset indicative of the difference between the network clock and the wireless processing section clock, and the GPS subsystem has a radio frequency (RF) front-end capable of receiving a GPS satellite signal, the aided GPS subsystem comprising:
   a GPS clock; and
   a GPS processor section that receives the GPS clock and at least one signal from the wireless processing section including the first offset, and in response produces at least one acquiring signal that is utilized by an acquiring unit to acquire the GPS satellite signal.

2. The aided GPS subsystem of claim 1, wherein the at least one signal from the wireless processing section may include a digital message.

3. The aided GPS subsystem of claim 1, wherein the GPS processing section includes:
   a GPS clock processor that receives the GPS clock and the first offset and produces a second offset representative of the difference between the GPS clock and a network clock that is external to the wireless device; and
   a GPS carrier and code generator that produces the at least one acquiring signal in response to receiving the offset signal from the GPS clock processor.

4. The aided GPS subsystem of claim 3, wherein the at least one signal from the wireless processing section may include a digital message.

5. The aided GPS subsystem of claim 3, wherein the GPS clock processor includes an offset counter that receives the GPS clock and the first offset and produces an offset counter output signal that is representative of the difference between the GPS clock and wireless processing section clock signal.

6. The aided GPS subsystem of claim 5, wherein the at least one signal from the wireless processing section includes information about the clock within the wireless processing section.

7. The sided GPS subsystem of claim 6, wherein the information about the clock within the wireless processing section includes the wireless processing section clock signal.

8. The aided GPS subsystem of claim 5 further including an offset combiner that produces the second offset signal in response to combining the offset counter output signal with the first offset signal from the wireless processor.

9. The aided GPS subsystem of claim 8, wherein the GPS carrier and code generator includes:
   a Doppler correction unit that produces Doppler correction values; and an offset combiner unit that combines the Doppler correction values with the second offset signal and produces a total offset signal that is utilized by die GPS carrier and code generator in producing the at least one acquiring signal.

10. The aided GPS subsystem of claim 3, wherein the GPS carrier and code generator includes:
a Doppler prediction model that produces Doppler correction values; and
an offset combiner unit that combines the Doppler correction values with a second offset signal and produces a total offset signal that is utilized by the GPS carrier and code generator in producing the at least one acquiring signal.

11. An aided Global Positioning System (GPS) subsystem within a wireless device, wherein the wireless device has a wireless processing section having a wireless processing section clock, the wireless processing section capable of receiving signals from a wireless network including a network clock signal and capable of generating a first offset indicative of the difference between the network clock and the wireless processing section clock, and the GPS subsystem has a radio frequency (RF) front-end capable of receiving a GPS satellite signal, the aided GPS subsystem comprising:
a GPS clock;
means for receiving the GPS clock and at least one signal from the wireless processing section including the first offset; and
means for producing in response to the receiving means at least one acquiring signal that is utilized by an acquiring unit to acquire the GPS satellite signal.

12. The aided GPS subsystem of claim 11, wherein the at least one signal from the wireless processing section may include a digital message.

13. The aided GPS subsystem of claim 11, wherein the GPS processing section includes:
means for receiving the GPS clock and the first offset;
means for producing a second offset representative of the difference between the GPS clock and a network clock that is external to the wireless device; and
means for producing the at least one acquiring signal in response to receiving the offset signal from the receiving means.

14. The aided GPS subsystem of claim 13, wherein the offset signal producing means includes an offset counter that receives the GPS clock and the first offset and produces an offset counter output signal that is representative of the difference between the GPS clock and wireless processing section clock signal.

15. The aided GPS subsystem of claim 14 further including an offset combiner that produces the second offset signal in response to combining the offset counter output signal with the first offset signal from the wireless processor.

16. The aided GPS subsystem of claim 15, wherein the producing acquiring signal means includes:
means for producing Doppler correction values; and
means for combining the Doppler correction values with the second offset signal and produces a total offset signal that is utilized by a GPS carrier and code generator in producing the at least one acquiring signal.

17. A method for aiding a Global Positioning System (GPS) subsystem within a wireless device, wherein the wireless device has a wireless processing section capable of receiving signals from a wireless network and the GPS subsystem has a radio frequency (RF) front-end capable of receiving a GPS satellite signal, the method comprising:

receiving a GPS clock, wireless processing section clock, message having information related to the wireless processing section clock nominal frequency, and a message having information related to an offset between the wireless processing section clock and a network clock external to the wireless device;
determining am acquiring signal in response to receiving the GPS clock, wireless processing section clock, wireless processing section clock nominal frequency message, and the offset message, wherein the acquiring signal is related to a frequency offset between the GPS clock and the network clock;
acquiring the GPS satellite signal in an acquiring unit that utilizes the acquiring signal.

18. The method of claim 17, wherein the acquiring signal includes a digital message having information related to the frequency offset between the GPS clock and the network clock.

19. The method of claim 17, wherein determining the acquiring signal further includes;
determining an offset between the GPS clock and the wireless processing section clock; and
determining the frequency offset between the GPS clock and network clock from the offset between the GPS clock and wireless processing section and the offset between the wireless processing section clock and the network clock.

20. The method of claim 19, wherein determining the acquiring signal further includes combining the frequency offset between the GPS clock and the network clock with the Doppler correction value.

21. The method of claim 20 further including adjusting a numerically controlled (NCO) with the combined frequency offset between the GPS clock and the network clock with the Doppler correction value.

22. The method of claim 21, wherein acquiring includes utilizing a correlator to acquire the received GPS satellite signal.

23. The method of claim 21, wherein acquiring includes utilizing a matched filter to acquire the received GPS satellite signal.

24. A signal-bearing medium having software for aiding a Global Positioning System (GPS) subsystem within a wireless device, wherein the wireless device has a wireless processing section capable of receiving signals from a wireless network and the GPS subsystem has a radio frequency (RF) front-end capable of receiving a GPS satellite signal, the signal-bearing medium comprising:
logic for receiving a GPS clock, wireless processing section clock, message having information related to the wireless processing section clock nominal frequency, and a message having information related to an offset between the wireless processing section clock and a network clock external to the wireless device;
logic for determining an acquiring signal in response to receiving the GPS clock, wireless processing section clock, wireless processing section clock nominal frequency message, and the offset message, wherein the acquiring signal is related to a frequency offset between the GPS clock and the network clock;
logic for acquiring the GPS satellite signal in an acquiring unit that utilizes the acquiring signal.

25. The signal-bearing medium of claim 24, wherein the logic for acquiring the GPS satellite signal includes a digital message having information related to the frequency offset between the GPS clock and the network clock.

26. The signal-bearing medium of claim 24, wherein determining logic the acquiring signal further includes:
- logic for determining an offset between the GPS clock and the wireless processing section clock; and
- logic for determining the frequency offset between the GPS clock and network clock from the offset between the GPS clock and wireless processing section and the offset between the wireless processing section clock and the network clock.

27. The signal-bearing medium of claim 26, wherein the logic for determining the acquiring signal further includes combining the frequency offset between the GPS clock and the network clock with a Doppler correction value.

28. The signal-bearing medium of claim 27 further including logic for adjusting a numerically controlled oscillator (NCO) with the combined frequency offset between the GPS clock and the network clock with the Doppler correction value.

29. The signal-bearing medium of claim 28, wherein the acquiring logic includes logic for utilizing a correlator to acquire the received GPS satellite signal.

30. The signal-bearing medium of claim 28, wherein the acquiring logic includes logic for utilizing a matched filter to acquire the received GPS satellite signal.

* * * * *